United States Patent [19]

Hebrank

[11] 4,337,585
[45] Jul. 6, 1982

[54] HEAT RECOVERY AND AIR PREHEATING APPARATUS FOR TEXTILE DRYER OVENS

[76] Inventor: William H. Hebrank, 14 Hermitage Rd., Greenville, S.C. 29615

[21] Appl. No.: 60,974

[22] Filed: Jul. 26, 1979

[51] Int. Cl.³ .................... F28D 17/00; F26B 19/00
[52] U.S. Cl. .................................. 34/86; 165/4; 165/5; 165/10
[58] Field of Search ............... 34/86; 165/4, 7, 10, 165/5, 97; 137/309; 110/254

[56] References Cited

U.S. PATENT DOCUMENTS

| | | | |
|---|---|---|---|
| 1,075,656 | 10/1913 | Koelbebeck | 34/86 X |
| 1,430,596 | 10/1922 | Scott | 34/86 X |
| 1,538,686 | 5/1925 | Chamberlain | 165/4 |
| 1,558,157 | 10/1925 | Forster | 137/309 |
| 1,994,515 | 3/1935 | Hausen et al. | 165/4 X |

FOREIGN PATENT DOCUMENTS 1162503 2/1964 Fed. Rep. of Germany ...... 110/254

*Primary Examiner*—Albert W. Davis
*Attorney, Agent, or Firm*—Dority & Flint

[57] ABSTRACT

Heat recovery and replacement air preheating apparatus for use in textile heat treatment machinery is disclosed as including a pair of thermal recovery and storage units wherein each storage unit contains a plurality of thermal mass disks which operate as heat sponges to pick up heat from exhausts as it leaves the dryer and subsequently to put that heat into entering replacement air whereby the cost in elevating the replacement air is greatly reduced. A control valve connected between the two thermal storage units cycles the reverse exhaust and replacement air flows alternately through the thermal storage units in a manner that a substantial amount of the exhaust heat does not reach the ambient environment and the alternating replacement air flow maintains the thermal heat recovery and storage units and associated apparatus cool and clean of lint and the like residuals.

6 Claims, 6 Drawing Figures

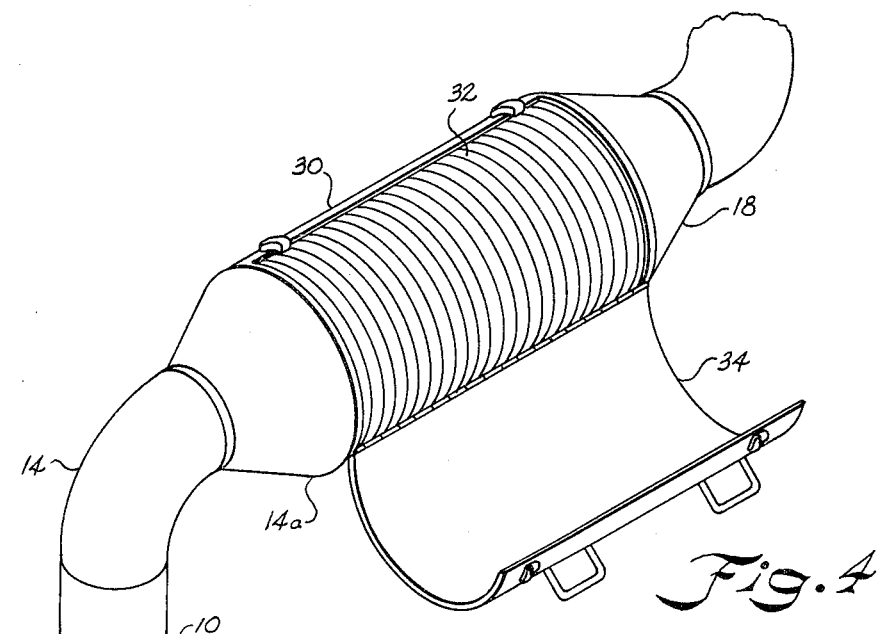
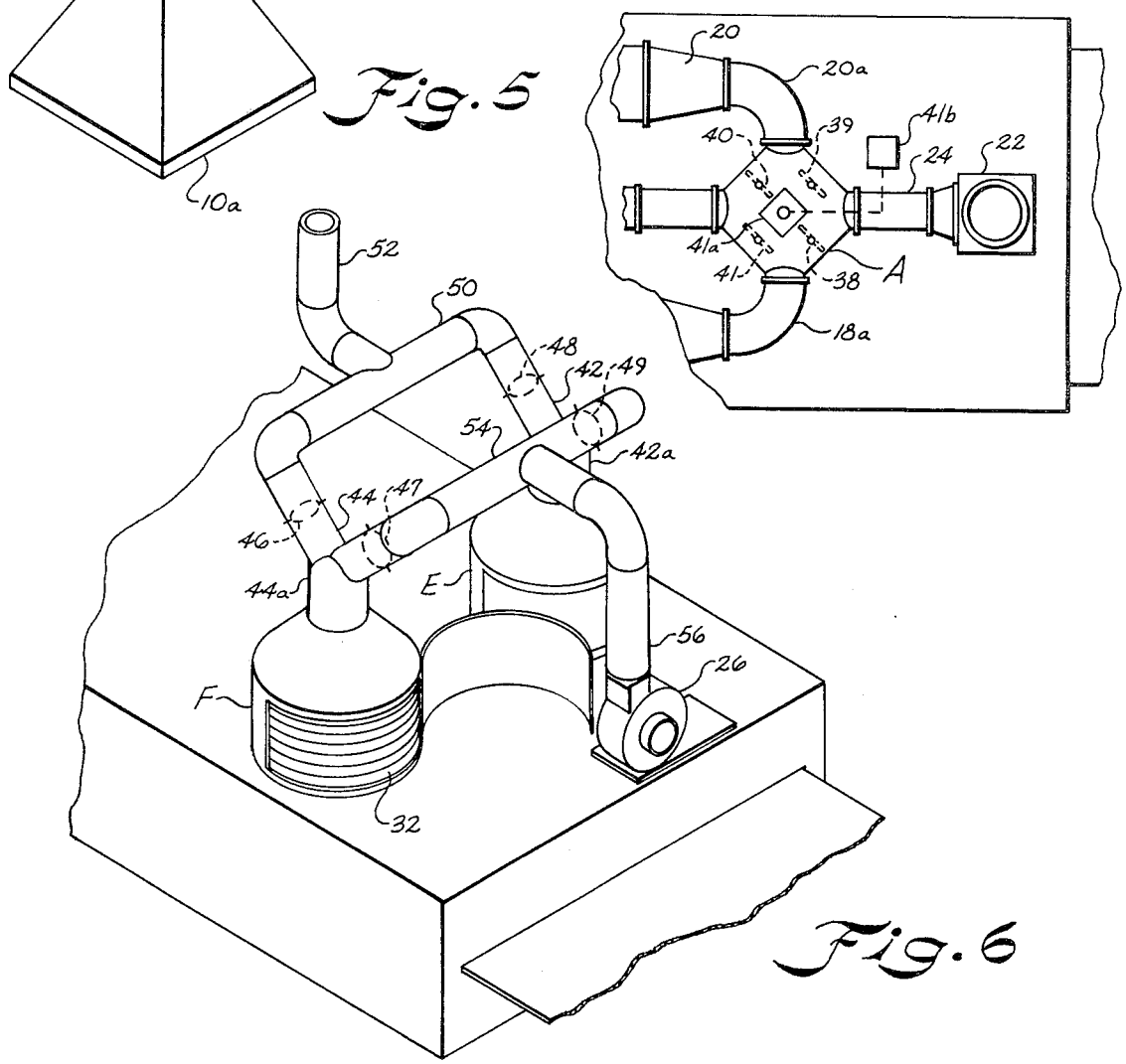

HEAT RECOVERY AND AIR PREHEATING APPARATUS FOR TEXTILE DRYER OVENS

BACKGROUND OF THE INVENTION

In the heat treatment of textiles, carpet, and the like, dryer ovens are utilized which include a heated insulated chamber through which cloth is passed to dry, finish or set the cloth. The air in the dryer must be steadily or frequently replaced at an adequate rate to carry away moisture evaporated from the cloth in drying or to carry away smoke or lint generated from the cloth in a finishing or setting operation. In practice, the air in the dryer is replaced with fresh makeup air at the rate of ten to twenty tons of air per hour. This air usually enters the dryer at room temperature and is exhausted from the dryer at temperatures of about three hundred degrees Fahrenheit. The heat required to elevate the temperature of the replacement air from room temperature to three hundred degrees requires one to two million BTU's per hour of heat energy which constitutes anywhere from forty to sixty percent of the heat used to operate the dryer.

It has been proposed to provide an air-to-air heat exchanger mounted to a textile dryer oven wherein the exhaust is passed in heat exchange relationship with the replacement air. However, such involves passing exhaust and makeup air in opposite directions through separate paths in the heat exchanger continuously in opposite directions requiring upkeep in maintaining a filter system and the heat exchangers clean and free of lint, smoke, and oil resulting from the heat treatment process. Such is also the case in U.S. Pat. No. 3,712,597 wherein a series of bayonet type metallic recuperative heat exchangers are utilized in combination with a continuous rotary regenerated air preheater in a glass manufacturing oven. The plugging and cleaning problems created by lint, oils and resins exhausted from textile dryers are a major deterrent to the use of heat exchangers on textile dryers.

In accordance with the present invention, exhaust heat recovery and replacement air preheating apparatus includes a pair of heat recovery and storage units installed in the walls of the dryer oven so that hot air exhausted from the dryer passes through one of the heat recovery and storage units wherein most of the heat energy is recovered by a plurality of heat absorbing elements. Cool replacement air simultaneously enters the dryer through the other of the heat recovery and storage units which has previously been heated by the exhaust whereby the replacement air is preheated. As a result, fresh replacement air is heated nearly to the dryer temperature before it enters the oven and exhaust air is cooled to approximately 130 to 160 degrees Fahrenheit before being released to the ambient atmosphere. The heat previously required to heat the replacement air is substantially reduced and the fuel required to operate a dryer oven can be cut almost in half.

The heat storage means are stationary. The heat storage end near the dryer is hot, the other end near the valve is cool. The exhaust carries two kinds of contamination which in combination plug heat exchangers. Lint made of fine fiber or dust will plug exchangers if the flow is continuous in direction. With this invention the reversing flow direction back flushes lint out of the heat storage before it passes the hot end so it does not plug or move through with smoke to the cool end. The second contamination in the exhaust is smoke consisting of volatized oil and resin from cloth in the dryer. Volatized oil and resin will condense when it contacts cool surfaces. It passes as gas through the hot storage end and condenses at the cold end but the lint has been separated out so build up on surfaces is minimal. The invention structure permits removal of the stationary storage elements at the cold end for simple periodic cleaning without interrupting dryer production. Thus, condensed oil and resin buildup can be held at operational levels. The heat of exhaust is effectively prevented from reaching the ambient environment and the ducts remain relatively cool eliminating the need for costly insulation.

SUMMARY OF THE INVENTION

It has been found according to the invention, that apparatus which recovers heat from exhaust gases and adds heat to replacement air can be had wherein the apparatus is automatically maintained substantially free of line, oils, smoke, and other residual matter which often clogs and renders the operation troublesome and inefficient by providing a pair of thermal storage units installed in the walls of the dryer oven and providing valve manifold means connected to the pair of thermal storage units which controls the reverse flows of exhaust gases and replacement air alternately between the two thermal storage units such that replacement air, passing through a storage unit previously heated by the exhaust flow, removes the heat and cleans any lint and the like previously taken in by the flow of exhaust gases.

Accordingly, an important object of the present invention is to provide simplified and economical apparatus for recovering heat from exhaust air and adding heat to replacement air to thereby reduce the cost of operating textile heat treatment machinery.

Still another important object of the present invention is the provision of exhaust heat recovery and replacement air preheating apparatus which includes two thermal storage units through which the reverse flows of exhaust gases and replacement air are alternately cycled in such a manner as to absorb heat previously stored and maintain the apparatus clean.

BRIEF DESCRIPTION OF THE DRAWING

The construction designed to carry out the invention will be hereinafter described, together with other features thereof.

The invention will be more readily understood from a reading of the following specification and by reference to the accompanying drawing forming a part thereof, wherein an example of the invention is shown and wherein:

FIG. 4 is an enlarged perspective view of a thermal storage unit for recovering and storing heat constructed according to the invention;

FIG. 5 is a top plan view of the apparatus of FIG. 1 with valve means according to the invention illustrated in a second position; and FIG. 6 is a perspective view illustrating an alternate embodiment for heat recovery and replacement air preheating apparatus according to the invention.

DESCRIPTION OF A PREFERRED EMBODIMENT

Figure 1:
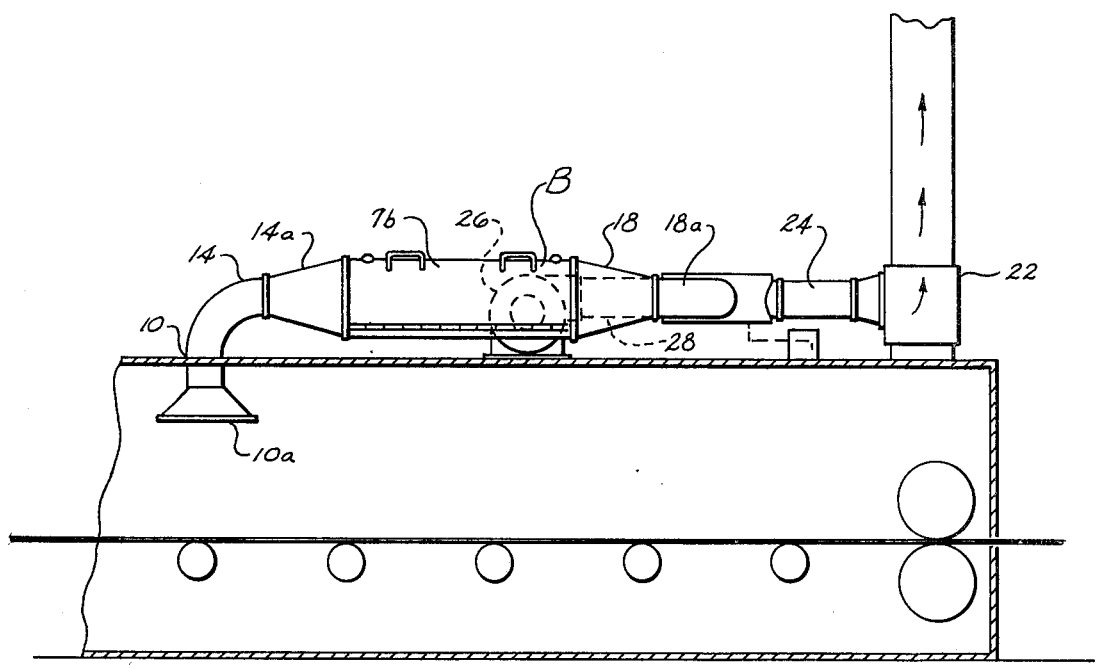
FIG. 1 is a side elevational view of exhaust heat recovery and replacement air preheating apparatus installed on a textile dryer oven according to the invention.

The drawing illustrates exhaust heat recovery and replacement air preheating apparatus for use in textile heat treatment machinery such as a textile dryer oven and the like which is heated by a suitable heating source wherein the apparatus includes a first port carried by the dryer oven and a second port carried by the dryer oven spaced from the first port with duct means being connected to the first and second ports. An exhaust means is connected in the duct for delivering a flow of hot exhaust gases outwardly from the dryer oven and replacement air flow means is connected in the duct for delivering a flow of replacement air inwardly to the dryer oven. Valve manifold means A connected in the duct means is provided for selectively controlling the reverse flows of replacement air into the dryer oven and exhaust gases out of the dryer oven alternately through the first and second ports. A first thermal storage means B is connected in the duct means in series flow relationship with the first port and valve manifold means A for recovering and storing heat from the exhaust gases and a second thermal storage means C is connected in the duct means in series flow relationship with the second port and valve manifold means A for recovering and storing heat from the exhaust gases in alternate cycles. Valve means D is included in the valve manifold means A which has a first position in which the flow of exhaust gases passes outwardly through the first port and thermal storage means B wherein heat is recovered and stored and in which the flow of replacement air passes inwardly through second thermal storage means B and preheated passing inwardly through the second port into the dryer oven. Valve means D has a second position in which the flow of exhaust gases passes through the second heat storage means C wherein heat is recovered and stored and the flow of replacement air passes through the first thermal storage B and preheated. Suitable means are provided for alternating valve means D between the first and second positions whereby the reverse flow of replacement air into the dryer oven cycles between the first and second thermal storage means after each has been previously heated by the flow of exhaust gases thereby recovering and returning heat exhausted from the dryer oven in the form of preheated replacement air in a manner which prevents the heat from reaching the outside environment and which maintains the heat recovery and storage apparatus cool and free of lint.

Referring now in more detail to the drawing, first and second port means are illustrated at 10 and 12, respectively. Each pot includes a lint or filter screen 10a and 12a, respectively, which is maintained clean by the reverse, alternate flows of replacement air. The duct means includes a straight section 14 and divergent section 14a connecting first thermal storage means B to port 10 and similar sections 16 and 16a connecting port 12 to thermal storage means C. The duct means further includes divergent section 18 and elbow section 18a connecting thermal storage unit B with manifold means A and similar sections 20 and 20a connecting storage means C and valve manifold A. Exhaust means may be provided by a suitable fan or blower 22 connected by means of a duct section 24 to the valve manifold A and replacement air may be delivered by a suitable blower means 26 by means of duct section 28 to the valve manifold means A.

Thermal storage means B and C are illustrated as including separate heat recovery and storage units each of which accommodates a single flow in one direction only at a time and includes a housing 30 in which is contained a plurality of circular heat absorbing disk elements 32 which are arranged in a series flow relationship one behind the other. Each disk includes an interior spiral strip 32a and zig-zag sinusoidal heat vanes 32b extending between adjacent runs of the spiral as illustrated. The housing is provided with an openable door section 34 whereby the individual heat absorbing elements may be removed for cleaning as necessary. It is preferred that the heat storage disks be staggered so that the air passages therein will not be in direct alignment but will repeatedly cut and divide the straight through flow exposing the vanes 32b of each heat absorbing element generally head on to the flow of air.

Figure 2:
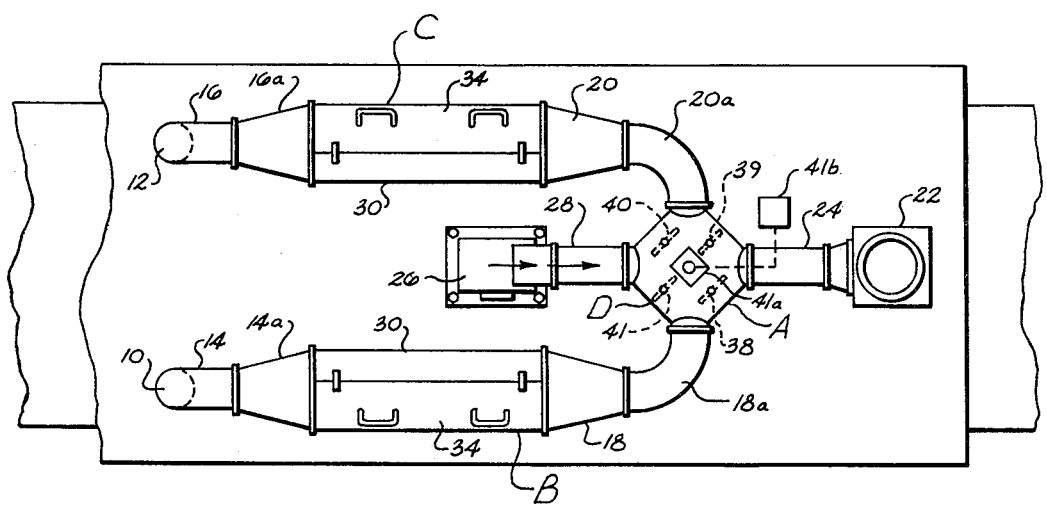
FIG. 2 is a top plan view of the apparatus of FIG. 1 illustrating valve means according to the invention in a first position.

The valve means D may consist of four conventional butterfly valves 38, 39, 40, and 41. In a first position of the valve means (FIG. 2), exhaust air is delivered through port 10, storage means B, and outwardly through open butterfly valve 38 through the exhaust blower 22 wherein most of the heat from the exhaust is recovered and stored in unit B. Also in the first position, replacement air is delivered by fresh air fan 26 through the open butterfly valve 40, duct 20, through the heat storage unit C into port 12. In a second position of the valve means (FIG. 5), flow through the thermal storage units is in a reverse direction namely, the flow of exhaust gases is outwardly through port 12, thermal storage unit C and open valve 39 to the exhaust blower 22 wherein heat is stored in the unit C. The flow of replacement air is through the replacement air fan 26, open valve 41, heat storage unit B, which has previously been heated by exhaust flow, and port 10. While the apparatus has been illustrated as being installed on the top of the dryer, it is to be understood that mounting in the side wall of the dryer is also possible and that more than one pair of ports, thermal storage units, and valve manifolding may be provided along the length of the dryer oven whereby the oven interior will be kept at a more uniform temperature over the length thereof subjecting the cloth to more uniform heat treatment.

Any suitable means may be provided for alternating the individual valves of valve means D between the first and second positions described above such as a conventional servomechanism 41a controlled by a clock timer 41b. In a preferred embodiment the valves alternate every thirty seconds whereby the heat is purged by replacement air for thirty seconds every thirty seconds prior to exhaust gases reheating a particular thermal storage unit.

Figure 3:
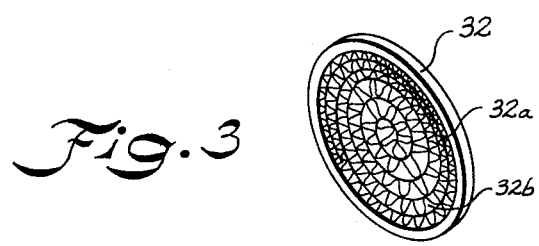
FIG. 3 is a perspective view of a heat absorbing element constructed according to the present invention.

Referring now to FIG. 4, an alternate embodiment of the apparatus according to the invention is illustrated wherein thermal storage units E and F are mounted vertically on top of the dryer oven and are connected to the interior thereof through a pair of ports having lint or filter screens carried thereover in a manner similar to ports 10 and 12. The storage units are likewise of the type illustrated in FIG. 3 wherein a plurality of individual heat absorbing disk elements 32 are provided which are of similar construction and may be removed by means of an openable door provided in the housing of each storage unit.

A somewhat different duct and valving arrangement is illustrated in FIG. 6 wherein the valve means is provided by two separate valve manifolds 42 and 44 wherein the valve means includes a pair of butterfly valves 46 and 47 and 48 and 49 carried therein, respectively. The valve manifolds are attached directly to the top of the thermal storage unit by a short stack section 44a and 42a, respectively. The duct means includes a U-shaped section 50 connecting each valve manifold 42 and 44 to an exhaust flow by means of a T-stem section 52. Each valve manifold is connected to a source of replacement air by means of a U-shaped duct section 54 and T-stem section 56. In operation, with the valve means in a first position, exhaust air will be delivered through thermal storage unit F when exhaust valve 46 is open at which time exhaust valve 48 will be closed. Intake valve 49 is opened for delivering replacement air through storage unit E and intake valve 47 is closed. In a second position of the valve means, exhaust valve 46 will be closed and exhaust valve 48 opened while intake valve 47 is open and intake valve 49 closed such that exhaust gases flow through unit E and replacement air through unit F whereby heat stored previously in unit F will be purged and unit E previously purged will again be heated.

Thus, it can be seen that a highly regenerative system can be had according to the invention wherein the heat from the dryer oven is returned before it reaches the outside environment in a manner which cleans the filters and apparatus automatically and maintains the heat absorbing elements in a relatively clean condition enhancing heat transfer and eliminating much hardware and upkeep.

While a preferred embodiment of the invention has been described using specific terms, such description is for illustrative purposes only, and it is to be understood that changes and variations may be made without departing from the spirit or scope of the following claims.

What is claimed is:

1. Heat recovery and replacement air preheating apparatus for use in textile heat treatment machinery comprising:
   a dryer oven heated by a suitable heat means having a dryer chamber through which textile fabric is passed for treatment;
   a first port carried by said dryer oven communicating directly with an interior of said dryer chamber;
   a second port carried by said dryer oven communicating directly with said interior of said dryer chamber spaced from said first port;
   duct means connected to said first and second ports;
   exhaust means for delivering a flow of hot exhaust gases from said dryer oven;
   air flow means for delivering a flow of replacement air to said dryer oven in a direction reverse to that of said flow of exhaust gases;
   valve manifold means connected in said duct means for selectively controlling said flow of replacement air into said dryer oven and said flow of gases out of said oven alternately through said first and second ports;
   first thermal storage means connected in said duct means in series flow relationship with said first port and said valve manifold means for recovering and storing heat from said exhaust gases;
   second thermal storage means connected in said duct means in series flow relationship with said second port and said valve manifold means for recovering and storing heat from said exhaust gases;
   valve means included in said valve manifold means having a first position in which said flow of exhaust gases passes through said first port and first thermal storage means and said flow of replacement air simultaneously passes through said second thermal storage means and said second port;
   said valve means having a second position in which said flow of exhaust gases passes outwardly through said second port and second heat storage means and said flow of replacement air simultaneously passes inwardly through said first heat storage means and first port; and
   means for alternating said valve means between said first and second positions;
   whereby said reverse flow of replacement air cycles between said first and second heat storage means after each has been previously heated by said flow of exhaust gases thereby purging and returning heat exhausted from said dryer in the form of preheated replacement air in a manner which maintains said apparatus substantially free and clean of lint from said textile fabric and in which a substantial amount of exhaust heat is prevented from reaching the outside environment and which maintains said apparatus at a reduced temperature.

2. The apparatus of claim 1 wherein each said thermal storage means includes a housing and a plurality of removable heat absorbing elements arranged serially in air flow alignment within said housing.

3. The apparatus of claim 2 wherein said valve manifold means is common to said first and second ports and includes a single manifold housing in which said valve means are carried.

4. The structure of claim 1 wherein said first and second thermal storage means are connected in said duct means between respective ones of said first and second ports and said valve manifold means.

5. The structure of claim 2 wherein said heat absorbing elements each includes a circular disk, a spiral strip carried within said disk, and a sinusoidal vane extending between adjacent spirals of said strip, said heat absorbing elements being arranged one behind the other so that said vanes are offset relative to next adjacent ones of said elements.

6. The structure of claim 1 including a lint screen carried between each said first and second ports and said first and second thermal storage means, respectively, for filtering said lint and other contaminants from said exhaust air to prevent the fouling and plugging of said thermal storage means, said lint screen being purged and cleaned by said alternate flow of replacement air.

* * * * *